United States Patent
Hose et al.

(10) Patent No.: US 7,133,685 B2
(45) Date of Patent: Nov. 7, 2006

(54) MONITORING BOUNDARY CROSSINGS IN A WIRELESS NETWORK

(75) Inventors: David A. Hose, Boulder, CO (US); James A. Fitch, Edmonds, WA (US)

(73) Assignee: Openwave Systems Inc., Redwood City, CA (US)

( * ) Notice: Subject to any disclaimer, the term of this patent is extended or adjusted under 35 U.S.C. 154(b) by 0 days.

(21) Appl. No.: 11/203,257

(22) Filed: Aug. 12, 2005

(65) Prior Publication Data

US 2005/0272443 A1 Dec. 8, 2005

Related U.S. Application Data (63) Continuation of application No. 09/903,982, filed on Jul. 11, 2001, now abandoned.

(51) Int. Cl.
*H04Q 7/20* (2006.01)

(52) U.S. Cl. ............. 455/456.1; 455/456.2; 455/456.3; 455/456.5; 455/456.6; 455/457; 455/414.1; 455/414.2; 455/404.2; 701/207; 340/990; 342/357.1; 342/357.13

(58) Field of Classification Search ..... 455/456.1–457, 455/414.1, 404.2, 414.2; 701/207; 340/990; 342/357.1, 357.13
See application file for complete search history.

(56) References Cited

U.S. PATENT DOCUMENTS

| | | | |
|---|---|---|---|
| 4,700,374 A | 10/1987 | Bini | |
| 4,876,738 A | 10/1989 | Selby | |
| 5,030,117 A | 7/1991 | Delorme | |
| 5,043,736 A | 8/1991 | Darnell et al. | |
| 5,208,756 A | 5/1993 | Song | |
| 5,223,844 A | 6/1993 | Mansell et al. | |
| 5,235,633 A | 8/1993 | Dennison et al. | |
| 5,272,638 A | 12/1993 | Martin et al. | |
| 5,317,323 A | 5/1994 | Kennedy et al. | |
| 5,327,144 A | 7/1994 | Stilp et al. | |
| 5,388,147 A | 2/1995 | Grimes | |
| 5,461,390 A * | 10/1995 | Hoshen | 342/419 |
| 5,479,482 A | 12/1995 | Grimes | |
| 5,515,419 A | 5/1996 | Sheffer | |
| 5,537,460 A * | 7/1996 | Holliday et al. | 455/435.1 |
| 5,546,445 A | 8/1996 | Dennison et al. | |
| 5,561,704 A | 10/1996 | Salimando | |
| 5,568,153 A | 10/1996 | Beliveau | |
| 5,579,535 A | 11/1996 | Orlen et al. | |
| 5,600,706 A | 2/1997 | Dunn et al. | |
| 5,625,688 A | 4/1997 | Ford et al. | |
| 5,673,322 A | 9/1997 | Pepe et al. | |
| 5,717,406 A | 2/1998 | Sanderford et al. | |
| 5,732,354 A | 3/1998 | MacDonald | |
| 5,736,959 A | 4/1998 | Patterson et al. | |

(Continued)

*Primary Examiner*—Steve M. D'Agosta
(74) *Attorney, Agent, or Firm*—Townsend and Townsend and Crew LLP (57) ABSTRACT

A method of providing location-based services for a mobile unit operating in a wireless network including network structures. The method includes receiving an identifier associated with the mobile unit. The method also includes monitoring a location of the mobile unit using the identifier and a network-assisted location finding system to identify a crossing of a service zone boundary by the mobile unit. The service zone boundary is defined by reference to at least one of the network structures. The service zone boundary also corresponds to a geographic zone boundary. The method further includes transmitting service information to a system user in response to the crossing of the service zone boundary.

20 Claims, 4 Drawing Sheets

U.S. PATENT DOCUMENTS

| | | |
|---|---|---|
| 5,736,962 A | 4/1998 | Tendler |
| 5,742,905 A | 4/1998 | Pepe et al. |
| 5,752,186 A | 5/1998 | Malackowski et al. |
| 5,754,955 A | 5/1998 | Ekbatani |
| 5,771,445 A | 6/1998 | Harano |
| 5,774,802 A | 6/1998 | Tell et al. |
| 5,787,347 A | 7/1998 | Yu et al. |
| 5,802,468 A | 9/1998 | Gallant et al. |
| 5,815,814 A | 9/1998 | Dennison et al. |
| RE35,916 E | 10/1998 | Dennison et al. |
| 5,835,907 A | 11/1998 | Newman |
| 5,844,522 A | 12/1998 | Sheffer et al. |
| 5,889,770 A * | 3/1999 | Jokiaho et al. ............. 370/337 |
| 5,901,353 A | 5/1999 | Pentikainen |
| 5,930,699 A | 7/1999 | Bhatia |
| 5,948,040 A | 9/1999 | DeLorme et al. |
| 5,982,762 A | 11/1999 | Anzai et al. |
| 6,011,973 A | 1/2000 | Valentine et al. |
| 6,421,009 B1 | 7/2002 | Suprunov |
| 6,463,273 B1 | 10/2002 | Day |
| 6,516,190 B1 | 2/2003 | Linkola |
| 6,650,902 B1 * | 11/2003 | Richton .................. 455/456.3 |

* cited by examiner

MONITORING BOUNDARY CROSSINGS IN A WIRELESS NETWORK

CROSS-REFERENCES TO RELATED APPLICATIONS

This application is a continuation of application Ser. No. 09/903,982, filed Jul. 11, 2001, now abandoned which is incorporated herein by reference in its entirety for all purposes.

BACKGROUND OF THE INVENTION

The present invention relates generally to providing location-based services in a wireless network and, in particular, to providing service information based on the crossing of a service zone boundary by a mobile unit in a wireless network.

A number of different types of location based service applications have been developed or proposed for wireless networks, i.e., communications networks involving at least one wireless interface between communicating devices. Generally, such applications determine or otherwise obtain location information regarding the location of a mobile unit under consideration, e.g., a wireless telephone, PDA, wireless data terminal or the like—and provide service information based on the mobile unit location. Examples of location based service applications include E911, local service information and location-based billing applications. In E911 applications, emergency calls are routed to a selected dispatcher based on the location of origin of an emergency call. Location based service applications provide information regarding local services such as hotels or restaurants based on a request entered via a mobile unit. In location based billing applications, a rate for a call placed or received by a wireless telephone is dependent on the location of the phone, e.g., whether the phone is inside or outside of a "home zone" for the subscriber proximate to the subscriber's residence, business or other defined location. Various other applications have been proposed or implemented.

Location based service applications generally involve comparing a current (or recent) location to predefined service zone definitions to make either a binary determination (e.g., that the mobile unit is either inside or outside of a zone under consideration) or a matching determination (e.g., that the mobile unit location matches or overlaps one or more stored zone definitions). In either case, at one or more relevant processing steps, mobile unit location information corresponding to a particular time is compared to service location information corresponding to one or more service zones, service provided locations or other stored location information. Thus, in E911 applications the mobile unit location at the time of placing an E911 call may be compared to the dispatcher coverage zones of an emergency response network. In local service information applications, the location of a mobile unit at the time of submitting, for example, a local hotel information request, may be compared to a database of hotel location information. The location of a mobile unit during a call may be used by a location based billing application to establish billing parameters for the call.

In addition, location based service applications generally provide service information in response to an input by a subscriber or other application user invoking the application. In the case of local service information applications, the input is generally an explicit service request entered via the mobile unit. In E911 or location based billing applications, the location based service application may be invoked invisibly, from the perspective of the mobile unit, upon making a call. In other cases, the input invoking the application to provide service information based on the location of the mobile unit, is received from an application separate or remote from the mobile unit requesting location based service information, e.g., identification of current mobile unit location. In such applications, the service information is nonetheless provided in response to an input requesting location-based services. That is, the trigger event generally is, from the perspective of the service application, a service request.

SUMMARY OF THE INVENTION

The present inventors have recognized that certain location-based service application functionality can be supported and enhanced by generating service information based on the location or movement of a mobile unit rather than in response to a service request from a subscriber, separate application or other system user or based on other criterion such as periodic reporting. In this manner, events associated with the movement of a mobile unit can be identified as may be desired for a variety of applications. Moreover, movement of an identified mobile unit relative to a geographic reference such as a service zone boundary can be monitored with minimal user inputs or communications between a location managing system and an associated wireless location based service application.

According to an embodiment of the present invention, a method of providing location-based services for a mobile unit operating in a wireless network including network structures is provided. The method includes receiving an identifier associated with the mobile unit and monitoring a location of the mobile unit using the identifier and a network-assisted location finding system to identify a crossing of a service zone boundary by the mobile unit. The service zone boundary is defined by reference to at least one of the network structures and service zone boundary corresponds to a geographic zone boundary. The method also include transmitting service information to a system user in response to the crossing of the service zone boundary.

According to another embodiment of the present invention, a method of identifying service zone boundary crossings by a mobile unit operating in a wireless network comprising a network-based location finding system is provided. The method includes receiving an identifier associated with the mobile unit and receiving a location of the mobile unit from the network-based location finding system. The method also includes monitoring the location of the mobile unit to identify an entry and/or an exit of the mobile unit into one of a plurality of cell sectors, wherein the plurality of cell sectors intersect a geographic zone boundary. The method further includes transmitting service information to a system user in response to the entry and/or exit of the mobile unit into the one of the plurality of cell sectors.

According to yet another embodiment of the present invention, a method for providing services based on a location of a mobile unit in a wireless communications network is provided. The wireless communications network includes a network-assisted location-based services application. The method includes receiving a geographic zone boundary referenced to a geographic topology and converting the geographic zone boundary to a service zone boundary referenced to a wireless communications network topology. The method also includes receiving a mobile unit identifier and monitoring the location of the mobile unit, using the network-assisted location-based services application and the mobile unit identifier, to identify a crossing of the service zone boundary by the mobile unit. The method further includes transmitting service information regarding the mobile unit in response to the crossing of the service zone boundary by the mobile unit.

According to an alternative embodiment of the present invention, a method for use in providing services based on the locations of mobile units in a wireless communications network is provided. The wireless network includes a switch structure for use in selectively routing communications between network users and a processing platform associated with the switch structure. The method includes providing a location-based services application running, at least in part, on the processing platform associated with the switch structure. The method also includes defining at least one geographic reference service zone boundary for the location-based service application. In an embodiment, the service zone boundary passes through at least one of a plurality of coverage areas of the wireless communications network for the location based services application. The method further includes storing an identifier for a mobile unit associated with a mobile subscriber, a location of said mobile unit being of interest to a system user other than said mobile subscriber and monitoring the location of the mobile unit, using the location-based services application and the identifier of the mobile unit, to identify a crossing of the service zone boundary by the mobile unit.

Additionally, the method includes transmitting service information to the system user regarding the mobile unit in response to the crossing of the service zone boundary by the mobile unit. In embodiments of the present invention, defining the at least one geographic reference service zone boundary includes identifying a geographical area for which the system user desires to receive notification upon one of: a) entry of the mobile unit into the identified geographical area; or b) exit of the mobile unit from the identified geographical area. Moreover, in embodiments of the present invention, transmitting service information includes providing notification to the system user of the entry or exit. Additionally, defining the at least one geographic reference service zone boundary further includes receiving zone location information regarding a service zone referenced to a first topology system and expressing said zone location information in terms of a second topology system of the location based services application, the first topology system including a street grid.

In a specific embodiment, the mobile unit is a telephone and the step of storing an identifier comprises storing an MIN/ESN. In another specific embodiment, transmitting service information further includes transmitting the service information to the mobile unit. In yet another specific embodiment, transmitting service information includes transmitting the service information to a data network node associated with the system user, the data network node being separate from the mobile unit. In a particular embodiment, transmitting service information includes transmitting a message to the system user providing notice of a boundary crossing event. In another particular embodiment, the message includes at least one of a voice, text, or graphical message.

In another particular embodiment, the location-based services application utilizes network assisted GPS to provide location information of the mobile unit. In yet another particular embodiment, transmitting service information includes transmitting service information to a network user separate from a user of the mobile unit. In some embodiments, defining the at least one geographic reference service zone boundary includes receiving subscriber specific information from the system user regarding the service zone boundary and storing includes indexing information regarding the service zone boundary to the identifier.

According to another alternative embodiment of the present invention, a method for use in providing services based on the locations of mobile units in a wireless communications network is provided. The wireless network includes a switch structure for use in selectively routing communications between network users and a processing platform associated with the switch structure. The method includes providing a location-based services application running, at least in part, on the processing platform associated with the switch structure and defining at least one geographic reference service zone boundary for the location-based service application. In embodiments of the present invention, the service zone boundary passes through at least one of a plurality of coverage areas of the wireless communications network for the location based services application. The method also includes storing an identifier for a mobile unit associated with a mobile subscriber, wherein a location of the mobile unit is of interest to a system user other than the mobile subscriber.

The method further includes monitoring the location of the mobile unit, using the location-based services application and the identifier of the mobile unit, to identify a crossing of the service zone boundary by the mobile unit. Additionally, the method includes transmitting service information to the system user regarding the mobile unit in response to the crossing of the service zone boundary by the mobile unit. In embodiments of the present invention, defining the at least one geographic reference service zone boundary includes identifying a geographical area for which the system user desires to receive notification upon one of: a) entry of the mobile unit into the identified geographical area or b) exit of the mobile unit from the identified geographical area. Additionally, transmitting service information includes providing notification to the system user of the entry or exit. Moreover, defining the at least one geographic reference service zone boundary further includes receiving zone location information regarding a service zone referenced to a first topology system and expressing the zone location information in terms of a second topology system of the location based services application, the second topology system including at least one of a geographical coordinate system or a system of wireless network subdivision identifiers.

According to a particular embodiment, providing a location-based services application comprises providing an application for allowing a person of authority to monitor the movements of one of a person or a vehicle associated with the mobile unit. According to another particular embodiment, defining the at least one geographic reference service zone boundary includes receiving subscriber specific information from the system user regarding the service zone boundary and storing includes indexing information regarding the service zone boundary to the identifier. According to yet another particular embodiment, providing a location-based services application includes providing an application for allowing a person of authority to monitor the movements of one of a person or a vehicle associated with the mobile unit. In some embodiments, the mobile unit is a telephone and storing an identifier comprises storing an MIN/ESN. In other embodiments, transmitting service information further includes transmitting the service information to the mobile unit. In yet other embodiments, providing a location-based services application includes providing an application for setting a billing parameter for use of the wireless network by the mobile unit.

According to another embodiment of the present invention, transmitting service information includes transmitting the service information to a data network node associated with the system user, the data network node being separate from the mobile unit. Moreover, in another embodiment, transmitting service information includes transmitting a message to the system user providing notice of a boundary crossing event. In a specific embodiment, the message includes at least one of a voice, text or graphical message. In an embodiment, the location-based services application utilizes network assisted GPS to provide location information of the mobile unit. Moreover, in another embodiment, transmitting service information includes transmitting service information to a network user separate from a user of the mobile unit.

According to yet another alternative embodiment of the present invention, a method for use in providing services based on the locations of mobile units in a wireless communications network is provided. The wireless network includes a switch structure for use in selectively routing communications between network users and a processing platform associated with the switch structure. The method includes providing a location-based services application running, at least in part, on the processing platform associated with the switch structure and defining at least one geographic reference service zone boundary for the location-based service application, wherein the service zone boundary passes through at least one of a plurality of coverage areas of the wireless communications network for the location based services application. The method also includes storing an identifier for a mobile unit associated with a mobile subscriber, a location of the mobile unit being of interest to a system user other than the mobile subscriber and monitoring the location of the mobile unit, using the location-based services application and the identifier of the mobile unit, to identify a crossing of the service zone boundary by the mobile unit.

The method further includes transmitting service information to the system user regarding the mobile unit in response to the crossing of the service zone boundary by the mobile unit. In embodiments of the present invention, defining at least one geographic reference service zone boundary includes identifying a geographical area for which the system user desires to receive notification upon one of: a) entry of the mobile unit into the identified geographical area or b) exit of the mobile unit from the identified geographical area. Moreover, transmitting service information includes providing notification to the system user of the entry or exit and defining at least one geographic reference service zone boundary further includes receiving zone location information regarding a service zone referenced to a first topology system and expressing the zone location information in terms of a second topology system of the location based services application. Additionally, monitoring includes storing first location information regarding a first location of the mobile unit at a first time, obtaining second location information regarding a second location of the mobile unit at a second time and comparing the first location information to the second location information to identify the crossing of the service zone boundary by the mobile unit.

In a specific embodiment, transmitting service information includes transmitting the service information to a separate application that is registered with the location-based services application to receive boundary crossing information regarding the mobile unit. In a particular embodiment of the present invention, the first location information includes a first zone identifier for a particular service zone and the second location information includes a second zone identifier for a particular service zone, and the step of comparing includes determining whether the first zone identifier is the same as the second zone identifier. In another specific embodiment, transmitting service information includes transmitting at least one of local service information or local emergency condition information to the mobile unit.

According to an embodiment of the present invention, a method for use in providing services based on the locations of mobile units in a wireless network is provided. The method includes establishing a location based services system, including a processing platform and data storage associated with the processing platform. The location based services system is interconnected to a network location finding system for receiving network location information therefrom regarding the location of the mobile units within the wireless network. The network location finding system is operative for determining the network location information regarding the mobile units based on locations of the mobile units and known locations of network structure in the wireless network.

The location based services system is further interconnected to a system user via a communication network including a switch structure for routing communications based on an address whereby user information can be transmitted from the location based services system to the user by associating the user information with a user address. The location based services system is additionally associated with a data input port for receiving information for storage in the data storage and for use by the location based services system.

The method also includes first receiving, via the data input port, service zone information identifying a geographic service zone including at least one service zone boundary and first storing the service zone information in the data storage of the location based service system. The method further includes second receiving, via the data input port, an identifier identifying a mobile unit of interest to the system user and second storing the identifier in the data storage of the location based service system. The method additionally includes third receiving, from the network location finding system, the network location information including mobile unit location information regarding the mobile unit of interest and third storing the mobile unit location information in the data storage of the location based service system.

Additionally, the method includes first operating the location based service system to 1) monitor locations of the mobile unit of interest over a time period, 2) make a comparison based on one or more of the monitored locations of mobile unit location to the service zone boundary, and 3) based on the comparison, identify a crossing of the service zone boundary by the mobile unit of interest. Moreover, the method includes second operating the location based service system to 1) generate service information in response to the identified crossing of the service zone boundary, 2) establish a user communication including the service information and information identifying the user address, and 3) transmitting the user communication to the system user. The system user receives service information triggered by the crossing of the service zone boundary.

According to another embodiment of the present invention, a method for use in providing services based on the locations of mobile units in a wireless communications network is provided. The wireless network includes a switch structure for use in selectively routing communications between network users and a processing platform associated with the switch structure. The method includes providing a location based services application running, at least in part, on the processing platform associated with the switch structure, defining at least one geographic reference for the location based services application, and storing an identifier for a mobile unit. The method also includes monitoring a location of the mobile unit, using the location based services application and the identifier of the mobile unit, to identify an attainment of a predetermined relationship of the mobile unit relative to the geographic reference, the attainment being defined by a change of status with respect to the predetermined relationship, and transmitting service information regarding the mobile unit in response to the attainment of the predetermined relationship of the mobile unit relative to the geographic reference.

In a specific embodiment, monitoring includes storing first location information regarding a first location of the mobile unit at a first time, obtaining second location information regarding a second location of the mobile unit at a second time, and comparing the first location information to the second location information to identify the attainment of the predetermined relationship. Moreover, in an embodiment, monitoring further includes defining a geometrical element interconnecting a first location of the first location information and a second location of the second location information and determining whether there is an intersection between the geometrical element and a boundary of a service zone.

According to yet another embodiment of the present invention, a method for use in providing services based on the locations of mobile units in a wireless communications network is provided. The method includes providing a location-based services application running, at least in part, on a processing platform associated with the wireless communications network, and defining at least one geographic reference service zone boundary passing through at least one of a plurality of coverage areas of the wireless communications network. The method also includes storing an identifier for a mobile unit associated with a mobile subscriber. A location of the mobile unit being of interest to a system user other than the mobile subscriber. The method further includes monitoring the location of the mobile unit, using the location-based services application and the identifier of the mobile unit, identifying a crossing of the service zone boundary using a mathematical analysis, and transmitting service information to the system user regarding the mobile unit in response to the crossing of the service zone boundary.

In a specific embodiment, defining the at least one geographic reference service zone boundary includes identifying a geographical area for which the system user desires to receive notification upon one of: a) entry of the mobile unit into the identified geographical area, or b) exit of the mobile unit from the identified geographical area. In some embodiments, transmitting service information includes providing notification to the system user of the entry or exit, and defining further includes receiving zone location information regarding a service zone referenced to a first topology system and expressing the zone location information in terms of a second topology system of the location based services application.

According to an alternative embodiment of the present invention, a method for use in providing services based on the locations of mobile units in a wireless communications network is provided. The method includes providing a location-based services application running, at least in part, on a processing platform associated with the wireless communications network and defining at least one service zone boundary passing through at least one of a plurality of coverage areas of the wireless communications network. The method also includes storing an identifier for a mobile unit, monitoring a location of the mobile unit, using the location-based services application and the identifier of the mobile unit, identifying a crossing of the service zone boundary using a mathematical analysis, and transmitting service information regarding the mobile unit in response to the crossing of the service zone boundary.

In a particular embodiment, the mathematical analysis includes storing first location information regarding a first location of the mobile unit at a first time, storing second location information regarding a second location of the mobile unit at a second time, and defining a geometrical element connecting the first location and the second location and determining whether the geometrical element intersects the service zone boundary.

According to another alternative embodiment of the present invention, a method for use in providing services based on the locations of mobile units in a wireless communications network is provided. The method includes providing a location-based services application running, at least in part, on a processing platform associated with said wireless communications network, defining at least one service zone boundary passing through at least one of a plurality of coverage areas of the wireless communications network, and storing an identifier for a mobile unit. The method also includes monitoring a location of the mobile unit, using the location-based services application and the identifier of the mobile unit, identifying a crossing of the service zone boundary using a mathematical analysis, and transmitting service information regarding the mobile unit in response to the crossing of the service zone boundary. The mathematical analysis is an overlapping area analysis including defining an uncertainty area surrounding the location of the mobile unit and determining whether an intersection area between the uncertainty area and a service area bordered by the service zone boundary is nonzero.

According to yet another alternative embodiment of the present invention, a method for use in providing services based on the locations of mobile units in a wireless communications network is provided. The wireless network includes a switch structure for use in selectively routing communications between network users and a processing platform associated with the switch structure. The method includes providing a location-based services application running, at least in part, on the processing platform associated with the switch structure, defining at least one geographic reference service zone boundary for the location-based service application, wherein the service zone boundary passes through at least one of a plurality of coverage areas of the wireless communications network for the location based services application, and storing an identifier for a mobile unit.

The method also includes monitoring a location of the mobile unit, using the location-based services application and the identifier of the mobile unit, to identify a crossing of the service zone boundary by the mobile unit, and transmitting service information regarding the mobile unit in response to the crossing of the service zone boundary by the mobile unit. In embodiments of the present invention, defining the at least one geographic reference service zone boundary includes receiving zone location information regarding a service zone referenced to a first topology system and expressing the zone location information in terms of a second topology system of the location based services application. The second topology system includes one of a geographical coordinate system and a system of wireless network subdivision identifiers and is an approximation of first topology. In some embodiments, the second topology includes the plurality of coverage areas intersecting the first topology. In other embodiments, the second topology is defined by a plurality of cell sectors associated with cell sector antennas.

The above noted functionality can be used to support and enhance a variety of applications. In certain applications, it is desired to provide notification when a mobile unit crosses a defined boundary. For example, a car rental company, or other fleet manager, may wish to be notified if a vehicle enters a proscribed area (e.g., crosses into a prohibited country) or exits a permitted area. Similarly, a parent, government official or other person in a position of authority may wish to monitor the movement of a child or other person or charge to insure that such charge has not entered a prohibited area or left a permitted area or area of confinement. In other applications, mobile unit location may be monitored relative to service zone boundaries to re-rate calls or to provide emergency or other service information to a subscriber upon entering a given service zone. In still other applications, a system user may wish to be notified when a mobile unit comes within a defined radius of a defined location, moves West, East, etc. of a defined location or attains a defined location in relation to the current location of another mobile unit. In another type of application, the boundary or other geographic reference may be defined at, or close to, the time of the location comparison rather than being predefined a substantial time prior to the comparison. For example, an application may notify a subject mobile unit when it comes within a certain distance of one or more other identified mobile units or vice versa. Such an application may be useful for helping friends or family members to rendezvous.

The present invention advantageously allows for monitoring position and movement of mobile units utilizing existing network structure. In this regard, location information for a mobile unit of interest can be obtained from a network assisted location finding system where location is determined based at least in part on the position of a mobile unit relative to a known location of a network structure, e.g., cell location, cell sector, AOA, TDOA, a GPS assist receiver system, a network overlay location transceiver, etc. The use of such network based location finding technologies allows applications in accordance with the present invention to service a variety of mobile units systems including conventional wireless phones and other devices without dedicated location equipment such as GPS transceivers. Thus, such applications can support a greater number of subscribers without specialized handsets or other subscriber equipment dedicated to location determination. Moreover, systems in accordance with the present invention can be implemented at least in part on network structure such as processing platforms associated with a network switch. For example, a location management system maybe associated with such a platform to receive location information, and provide notification information to a wireless location application when a mobile unit under consideration attains a predetermined relationship relative to a stored geographic reference. By utilizing such network structure, rather than implementing such functionality on an on-board computer or other subscriber equipment, the associated application can have convenient access to a centralized database which may be conveniently updated to provide more current information.

Moreover, implementing such applications in connection with existing structure allows network providers, carriers and the like to make enhanced services available to existing subscribers and to thereby distinguish themselves from competing service providers.

BRIEF DESCRIPTION OF THE DRAWINGS

For a more complete understanding of the present invention and further advantages thereof, reference is now made to the following detailed description, taken in conjunction with the drawings, in which.

DETAILED DESCRIPTION OF SPECIFIC EMBODIMENTS

The present invention is directed to a method and system for providing service information in a wireless network in response to and based on a comparison of mobile unit location information to a stored geographic reference information. The following description includes an initial discussion of exemplary applications that are supported by the present invention, followed by a description of the preferred network for implementation of the invention and then a description of preferred processes for implementing the invention.

A. Applications

The present invention supports a number of applications where service information is generated in response to detection of a mobile unit attaining a particular position in relation to a geographic reference, e.g., detection of a service zone boundary crossing. A number of examples of such applications are described below. It will be appreciated that many more examples are possible. Nonetheless, the following examples illustrate that such applications can vary, for example, with respect to the types of service information that are generated as well as how and to whom or what the service is reported.

One type of application where it may be desired to monitor boundary crossings relates to fleet management such as rental vehicle tracking. Rental vehicles may be tracked to insure that the tracked rental vehicle is being used in accordance with the rental contract, e.g., that the vehicle is not being taken across certain national borders. Boundary crossings may be proscribed due to insurance limitations, political/social considerations or other reasons. The rental company may therefore desire to receive notification when boundary crossings occur. It will be appreciated that the rental company would not necessarily require continual updates of vehicle locations (though some companies may choose to obtain such updates) but, most importantly for present purposes, will desire notification triggered by a boundary crossing event.

Such notification can be conveniently provided via a data network such as the Internet. In this manner, an official of the rental company may receive a graphical or text notification identifying the monitored vehicle and the boundary crossing event, e.g., "ID #nnn has crossed into/out of the United States." In response to such notification, the rental company may contact the lessee (e.g., by car phone) remotely disable the rental vehicle, assess a contractual penalty or take other remedial measures.

As will be discussed in more detail below, such a boundary crossing event can be identified using a conventional wireless telephone or other mobile unit carried by the rental vehicle and, preferably, configured to remain powered on when the vehicle is in use. Such a monitoring application can take advantage of existing wireless network platforms and location finding equipment to provide monitoring with minimal, if any, equipment on board the rental vehicle dedicated to position monitoring, thereby reducing costs and facilitating rapid deployment. As described below, a wireless network platform remotely or locally associated with a network switch can be connected to one or more location finding equipment systems for receiving location information regarding the monitored vehicle or its on-board mobile unit and can be further connected to a data network for providing reports to the rental company's data terminal.

Another type of application where it may be desired to monitor boundary crossings is location based billing applications. In these applications, the rate applied for calls placed or received using a wireless telephone depends on the location of the phone. For example, wireless carriers may wish to encourage subscribers to use their wireless phones as their only phones by providing call rating competitive with land line phones for calls placed in or near the subscriber's home, office or other defined location, but providing a different rating for calls placed or received outside such "home zones." The relevant rating information may be provided to a billing system of the carrier or other service provider by populating an associated field of a Call Detail Record (CDR) with a billing value.

In connection with such applications, it may be desired to monitor boundary crossings for a number of reasons. For example, identifying crossings into or out of a home zone may be used to re-rate an ongoing call or otherwise re-set a billing parameter. Also, it may be useful to provide an indication to the subscriber regarding location relative to a home zone, e.g., via a display element on the handset, so that the subscriber can know in advance of a call what rates may apply. Thus, boundary crossings may be monitored in order to transmit messages to the mobile unit causing the display element to toggle between "home zone" and "outside home zone" displays. In the case of call re-rating, a single call may be divided into parts billed at different rates, e.g., by generating multiple CDRs, or a single rate may be selected based on a boundary crossing. In either case, the service information provided by the application may simply be a rating value and the recipient may be a billing application.

A final example of applications that may make use of boundary crossing information is a local service or friend notification application. Such an application may provide emergency information—e.g., regarding local traffic, weather, or other emergency conditions—or other service information—e.g., information about local hotels, restaurants or other services—to all or subscribing system users upon entry into a service area. For example, in the case of severe weather warnings, a traveler may be notified by phone or display upon entering the affected area (such as on crossing a county line). For a traffic jam, warnings and alternative route or other information may be provided to commuters coming within a certain area encompassing the problem location. Similarly, local service providers may transmit pricing, event or other service information to willing, approaching travelers. In the case of "friend" notification, a subscribing system user and/or an identified "friend" may be notified when the user comes within a certain proximity of the mobile unit of the friend or the friend comes within a certain proximity of the user. In such cases, the "boundary" may be defined and redefined "on the fly".

In such cases, service information may be transmitted to the monitored mobile unit, an associated data terminal or other device proximate to the monitored unit. The information may be provided in audio, text, graphical or other form depending, for example, on the limitations of the user equipment and the type of information required. Transmission of the service information may be triggered by crossing a political or government boundary, crossing within a radius of a location of interest or otherwise crossing a service zone boundary of any shape.

As the foregoing examples illustrate, the type of service information, form of service information transmission, intended recipient and other details can vary from application to application or even within a particular application in accordance with the present invention. This will be further understood upon consideration of a preferred network environment of the present invention as described below.

B. Network Environment

The present invention can be implemented in a wireless communications network such as a wireless telephone network. Such an implementation has a number of advantages. First, in many cases, wireless networks have access to location information regarding mobile units located within the wireless network or certain areas thereof from existing location finding equipment. In many cases, such location finding equipment is capable of providing location information for any mobile unit within the coverage area. Moreover, certain location finding technologies can provide location information without requiring any specialized subscriber equipment dedicated to location finding. In addition, the present invention can make use of existing network structure such as processing platforms and switching equipment to access location information, perform location calculations as desired and route service information to system users. In this manner, a system for providing service information in accordance with the present invention can be readily implemented. Moreover, such services can be marketed to wireless network subscribers, and service providers who desire access to such subscribers, thereby facilitating system deployment and enabling wireless carries to provide a value added service that may distinguish the carrier from competitors.

Various types of location finding systems can be used in accordance with the present invention. Preferably, the location finding system is a network assisted technology such as AOA, TDOA, network assisted GPS, cell sector or similar network based system thereby making use of existing technology associated with the wireless network. In one embodiment, the location finding system employed is a fully network based system such as a cell sector system that provides location information regarding a mobile unit of interest without requiring any mobile unit based equipment dedicated to location determination. In addition to cell sector technology, such systems included AOA, TDOA and the like.

Figure 1:
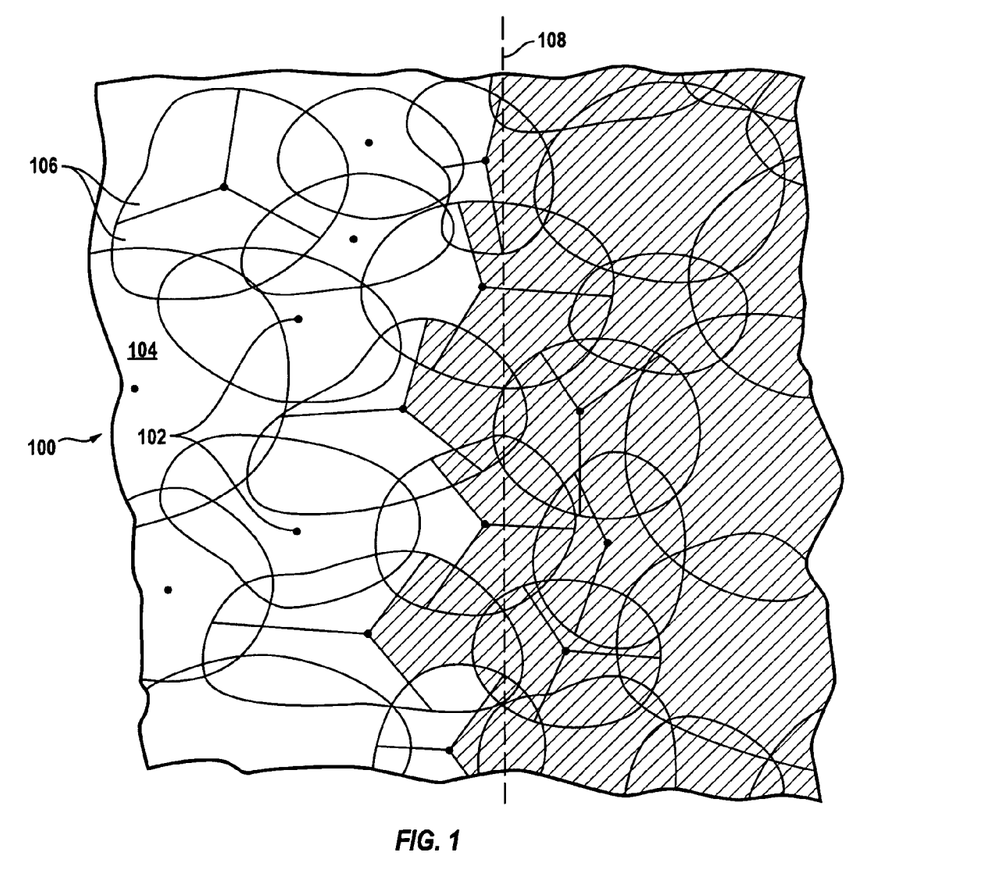
FIG. 1 illustrates the representation of a service zone boundary in accordance with the present invention using a cell-sector based location finding technology.

FIG. 1 illustrates a wireless network 100 utilizing a cell sector technology to represent a service boundary 108. The network 100 includes a number of cell sites 102 each having an associated coverage area 104 within which cell site equipment can communicate with mobile units via RF signals. As shown, the coverage areas 104 of each cell may be irregular in shape due to, for example, local geography and other local signal transmission characteristics. Moreover, the coverage areas 104 may overlap as shown to insure relatively complete coverage. Coverage areas may also overlap in order to provide better service in high usage areas of the network.

A cell site 102 may include a number of directional antennas that effectively divide the coverage 104 into a number of sectors 106. In the illustrated embodiments, individual cells are divided into three sectors 106, each of which covers approximately 120 degrees of the coverage area 104 surrounding the cell site 102. Thus, each sector 106 encompasses a generally wedge-shaped area.

A location finding system utilizing cell sector technology provides a somewhat coarse indication of mobile unit location. In particular, the location of a mobile unit is approximately known by determining which cell sector antenna is handling communications with the mobile unit. Based on this information, the mobile unit is deemed to be within the associated generally wedge-shaped area. For processing purposes, the associated location may be expressed as a two-dimensional coordinate location, e.g., representing a center point of the generally wedge-shaped area, and an uncertainty area, e.g., defined by an uncertainty radius. Such an uncertainty radius may be selected to reflect the uncertainty inherent in the cell sector technology. It will be appreciated that alternative location finding technologies may provide greater accuracy. For example, AOA, and TDOA methodologies are capable of providing greater accuracy than cell sector technologies. Moreover, in areas of a wireless network where more than one location finding technology is available, location information from multiple location finding technologies, or the raw location information from which location determinations are made using one or more of the technologies, may be combined to provide even greater accuracy.

In FIG. 1, the dashed line 108 represents a service zone boundary. For present purposes, the area to the right of the service zone boundary 108 may be taken to define a service zone such as a zone within which authorities wish to disseminate emergency information. In the illustrated network 100 which utilizes a cell sector based location finding technology, the boundary 108 and associated service zone are approximated by a set of cell sectors. These cell sectors are the shaded sectors 106 in FIG. 1. It will thus be observed that the shaded cell sectors 106 generally coincide with the service zone, although the boundary 108 is only followed imperfectly. In the illustrated example, the service zone definition depicted by the shaded cell sectors is over inclusive in that any cell sector that is at least partially within the service zone is included in the service zone definition. As a practical matter, this means that any mobile unit that may or may not be within the surface zone due to the uncertainty inherit in the cell sector technology may be deemed to have crossed the boundary 108 and may therefore receive the emergency information.

Figure 2:
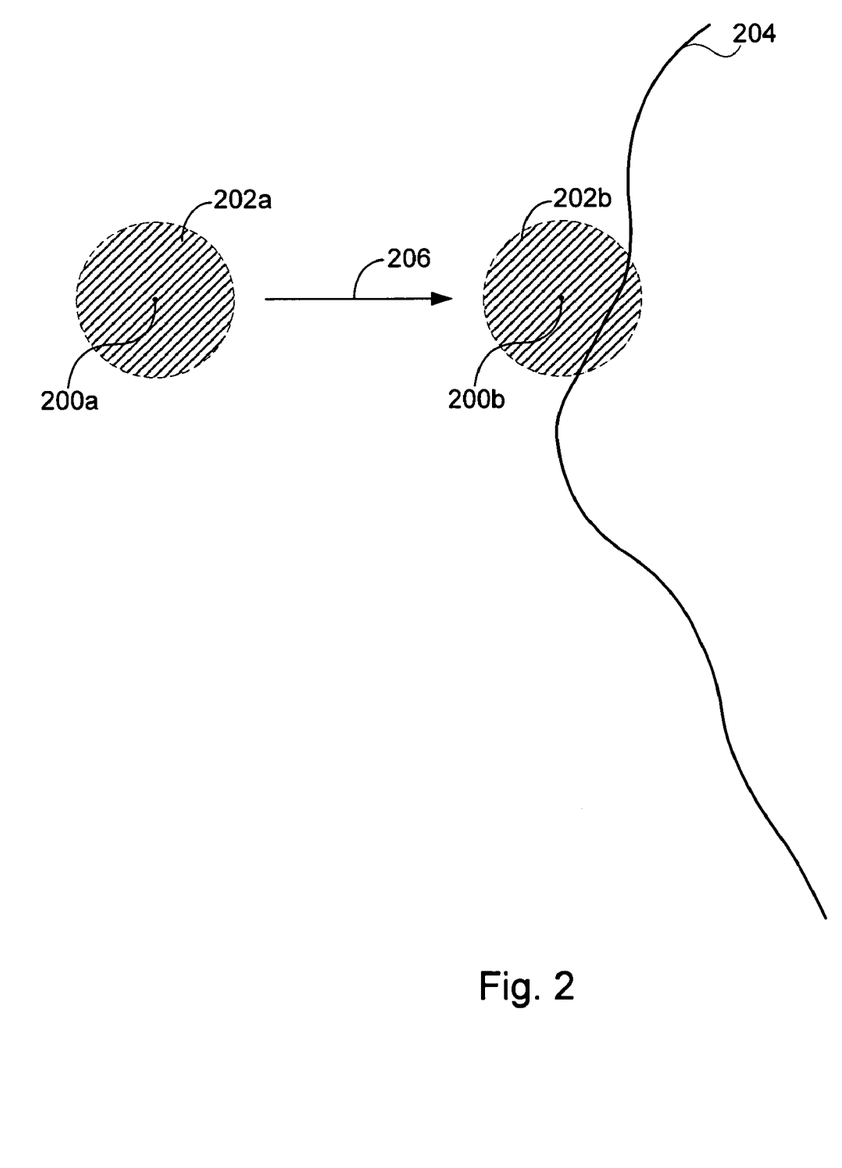
FIG. 2 illustrates activity that may be deemed a service zone boundary crossing in accordance with the present invention.

More specifically, the system of the present invention can provide service information based on a boundary crossing determination as opposed to, for example, a binary determination that a mobile unit is either inside or outside a service zone at a particular instant in time. This is illustrated in FIG. 2. In FIG. 2, the location of a mobile unit is indicated by a point, e.g., defined by two-dimensional coordinates, and an uncertainty area 102. In the illustrated implementation, the uncertain area is taken to be defined by an uncertainty radius surrounding the point 200, but it should be appreciated that uncertainty areas of other shapes may be utilized. In FIG. 2, a current location of a mobile unit is shown in solid lines and a prior location of the mobile unit is shown in dashed lines. The presumed movement of the mobile unit between the two times is therefore indicated by arrow 206.

FIG. 2 illustrates activity that may be characterized as a boundary crossing. In particular, reference numeral 204 indicates a service zone boundary. In this case, the boundary 204 defines a service zone of complex shape as may be desired in a particular application. At the first time, the location of the mobile unit as indicated by the point 200 and the uncertainty area 202 is fully located on a first side of the boundary 204. At the second time, the location of the mobile unit as indicated by the point 200 and the uncertainty area 202 is undetermined with respect to the boundary 204. That is, a portion of the uncertainty area 202 at the second time overlaps a portion of the service zone. Accordingly, the mobile unit may be within the service zone. This change in status from the first time to the second time (i.e., from "outside" the service zone to "potentially inside") may be deemed a boundary crossing event for the purposes of a particular application. It will be appreciated that a boundary crossing event may similarly be indicated by a change in status from clearly outside the service zone to clearly inside the service zone, i.e. where the entire uncertainty area at the second time is within the service zone.

The example of FIG. 2 suggests one mathematical analysis for identifying a boundary crossing event. Specifically, a change in status between the first time and the second time is determined relative to an overlapping area analysis. At the first time, the area of overlap between the uncertainty area 202 and the service zone is a mathematical nullity. At the second time, there is an intersection between a set of area units comprising the uncertainty area 202 and the set of area units comprising the service zone. For example, the area units may be elements of a Quadtree data structure utilized to represent the area of a wireless network such as described in co-pending U.S. patent application Ser. No. 09/788,036 which is incorporated herein by reference in its entirety.

It will be appreciated that a variety of other mathematical models may be utilized in accordance with the present invention to identify a boundary crossing relative to first and second location information. For example, a first mathematical representation may be defined to represent a line segment or other geometric element interconnecting the first point 200 (associated with the first time) and the second point 200 (associated with the second time) or the first area 202 and the second area 202 and a second mathematical representation may be utilized to define the boundary 204. These mathematical representations may then be compared e.g., by simultaneously solving equations, to identify any intersection. Alternatively, a ray may be defined emanating from the point 200 at the first time in a selected direction. Another ray may be defined emanating from the point 200 at the second time in the same or a different direction. At each time, the number of instances that the ray crosses the boundary 204 may be determined to thereby provide an indication that the point under consideration is inside or outside of the service area. Any change in status in this regard between the first time and the second time would be indicative of a boundary crossing. Many other solutions are possible as will be appreciated as one skilled in the art.

For many applications, identifying a boundary crossing may provide advantages relative to generating service information based on a binary determination that a mobile unit is located within or outside a service area at an instant in time. For example, it may be desirable to provide emergency information or local service information only upon entering a service zone rather than continuously while a mobile unit is located within a service zone. This objective can be achieved by triggering transmission of the service information based on a boundary crossing rather than based on a determination that the mobile unit is inside of the service zone. Moreover, in other contexts, transmissions between a network platform and a mobile unit may be reduced thereby conserving bandwidth. For example, as noted above, in a location based billing application, it may be desirable to provide an indication on a display of the mobile unit indicating that the mobile unit is either inside or outside of a home zone. Such information may be transmitted from a network platform to a mobile unit. In order to minimize such transmissions, updated information may be transferred to the mobile unit only upon a change in status with regard to the home zone boundaries.

Figure 3:
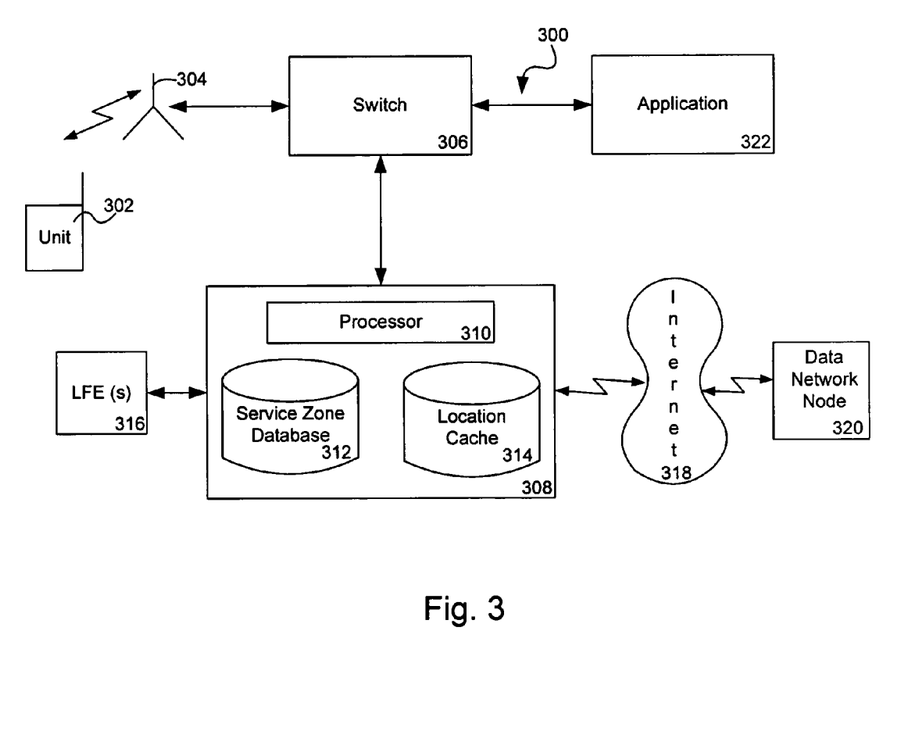
FIG. 3 shows a wireless network implementing the system of the present invention.

FIG. 3 illustrates a wireless network 300 implementing the present invention. In the network 300, a mobile unit 302 communicates with cell site equipment 304 via an RF interface. In the illustrated example, the mobile unit 302 is shown as being a wireless telephone. It will be appreciated, however, that any suitable mobile unit can be utilized including, for example, personal digital assistants, data terminals having a wireless modem, etc. The cell site equipment 304 may be, for example, a cell sector antenna or the like. In the illustrated network 300, the cell site equipment 304 is interconnected to a switch 306. Although only one piece of cell site equipment 304 is illustrated, it will be appreciated that switch 306 may service multiple cells. The switch 306 may be, for example, a mobile switching center (MSC) or any other structure for routing communications between a calling unit and a called unit. As will be discussed in more detail below, the switch 306 may also be operative for generating billing records such as Call Detail Records for transmission to a billing application of a wireless carrier or other service provider.

FIG. 3 also shows a platform 308 associated with the switch 306. The platform 308 may be, for example, a computer platform for executing a variety wireless network applications. The platform 308 may be physically located proximate to the switch 306 or may be remotely located and interconnected to the switch 306 by a local area network, wide area network or other communications pathway. The illustrated platform 308 includes a microprocessor 310 for running a boundary crossings application in accordance with the present invention. As will be understood from the description below, a boundary crossings application in accordance with the present invention may be a fully self-contained application for receiving location information, identifying a boundary crossing and providing service information in response to the boundary crossing in the form desired by the end user. Alternatively, a boundary crossings application in accordance with the present invention may function as a module to identify a boundary crossing and provide information regarding the boundary crossing for further processing by another application. In order to identify boundary crossings, the boundary crossing application running on processor 310 can access service zone information and location information. The service zone information provides a definition of service zones for use by the application. These definitions may be provided in any suitable form. For example, a service zone may be defined as a set of cell identifiers or cell sector identifiers that represent the service zone. Alternatively, the service zone information may be stored as a set of geographical coordinates or geographical boundaries that define the service zone. For cell sector implementations, such geographical information may be converted into current network topology, e.g., cell sector identifiers, at the time of a boundary crossing determination. It will be appreciated that other conventions may be utilized for storing a representation of a service zone area. In addition, it will be appreciated that a GIS system may be utilized for inputting and formatting the service zone information. For example, a service provider or other person defining a service zone may wish to input service zone boundaries relative to an address, streets or other topological information. A GIS application, such as the MAPS application marketed by SIGNALSOFT Corporation of Boulder, Colo., may be utilized to receive such inputs and convert the associated service zone definitions into geographical information formatted for convenient handling by the boundary crossing application. Thus, service zone definitions may be converted from one topological system, e.g., addresses or street boundaries, to another topological system, e.g., geographical coordinates or cell/cell sector identifiers.

Location information regarding the locations of mobile units may also be stored for access by the boundary crossings application. Depending, for example, on the nature of the location finding technology employed, the nature of the received location information and the route by which the information is obtained may vary. For example, in the case of cell sector location information, a cell sector identifier may be extracted from communications between the mobile unit 302 and the switch 306. In the case of handset-based location finding equipment such as GPS information, location coordinates may be encoded into communications transmitted from the unit 302 to the cell site equipment 304. In other cases, raw location information may be preprocessed by a location management program running on the platform 308. In any case, in accordance with the present invention, location information may be stored in location cache 314 so as to enable later use in a boundary crossing analysis such as comparison of mobile unit location information for a first time and a second time.

In the illustrated embodiment, the platform 308 is illustrated as housing a service zone database 312 and a location cache 314. Such a service zone database 312 may include service zone definitions for one or more applications. The location cache 314 may include location information for mobile units at various times indexed, for example, to a mobile unit identifier such as a MIN/ESN. Although the database 312 and cache 314 are thus illustrated as distinct elements, it will be appreciated that the database 312 and cache 314 may utilize shared or non-dedicated memory resources. Moreover, the database 312 and cache 314 need not be located on the platform 308 or on the same machine as one another, but rather, may reside at any location where the stored information can be accessed by the boundary crossing application.

As noted above, depending on the specific application and other factors, the resulting service information can be transmitted to different recipients via different pathways. For example, in the case of the above noted rental vehicle tracking application, the resulting service information is provided to a data terminal at a rental company remote from the monitored mobile unit. To support such applications, service information can be transmitted from the illustrated platform 308 to a data network node 320 via a data network 318 such as the Internet. In other applications, such as re-rating for location based billing applications, the recipient of the service information is another application such as a billing application that is registered with the boundary crossings application to receive service information, e.g., related to boundary crossings. In the case of the location based billing application, the service information may be a billing value of a Call Detail Record (CDR). In such a case, the service information may be transmitted to application 322 by way of the switch 306. In other cases, such as the above noted emergency service or local service applications, it is desirable to transmit the service information to the monitored mobile unit 302. In such cases, the service information may be transmitted to the unit 302 via the switch 306 and cell site equipment 304.

The service information may be presented in various forms. For example, service information may be transmitted to the mobile unit 302 via a short messaging system for providing an audio message that can be played on the unit 302. Alternatively, a text message may be displayed on a LED display or other display of the mobile unit 302. As previous noted, an output may be provided to an application 322 such as a billing application by populating a field of the CDR. In other applications, an audio, text and/or full graphics presentation (e.g., a graphical map showing mobile unit location) may be provided at a data network node 320. It will thus be appreciated that the boundary crossings application may utilize appropriate hardware, firmware and/or software for providing the service information in the appropriate format and in accordance with appropriate protocols. Thus, the information may be packetized for transmission across the Internet in accordance with IP protocols. Data may also be transmitted to the mobile unit 302 utilizing proxies, microbrowser and other elements for executing wireless data communications protocol. Similarly, in the case of a CDR output, the CDR may be populated in accordance with telecommunications network protocols.

C. Process Implementation

Figure 4:
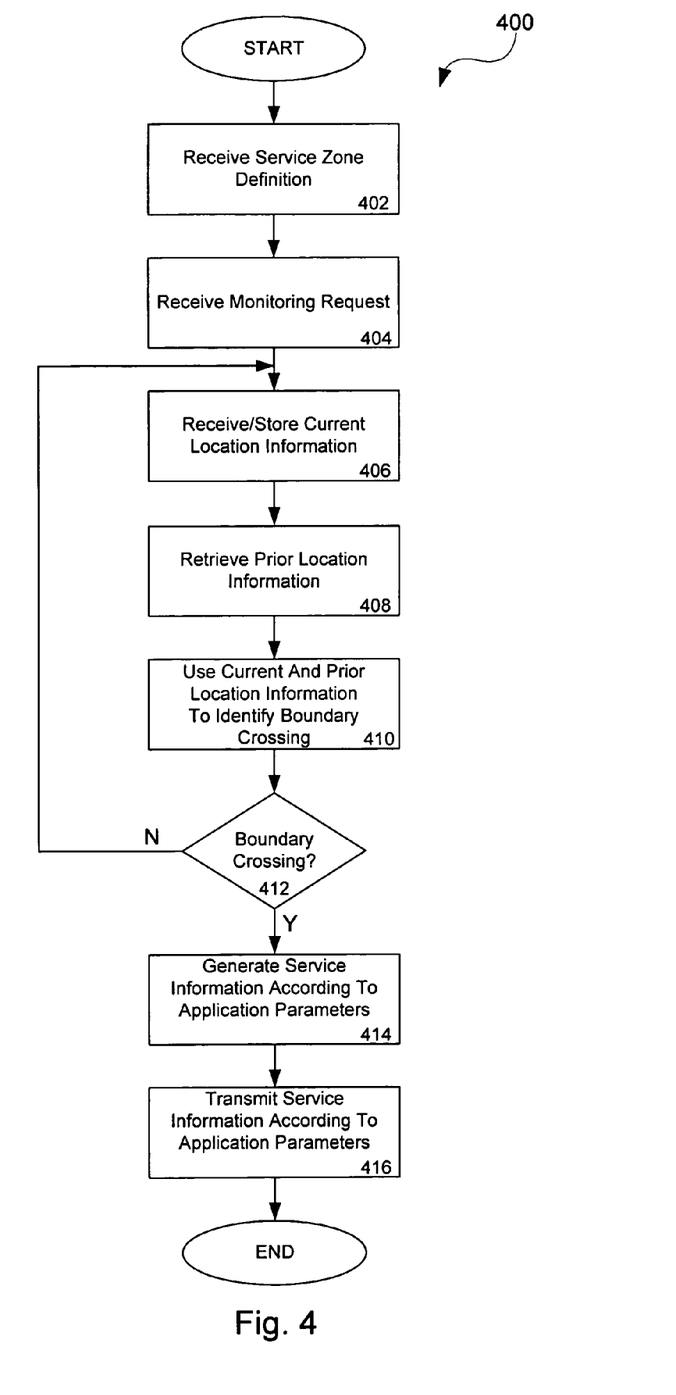
FIG. 4 is a flow chart illustrating a preferred implementation of the present invention.

FIG. 4 is a flowchart illustrating a process 400 for implementing a boundary crossings application in accordance with the present invention. The process 400 is initiated by receiving (402) a service zone definition for the application. As noted above, the nature of the service zones can vary from application to application. The service zones or associated boundaries may include political or government boundaries, street or other topological data, geographical coordinates and associated cell sector identifiers or other zone delineators or other geographical information. Such information may be input using GIS application or by other means.

The boundary crossings application further receives (404) a monitoring request. For example, a vehicle rental company may enter the MIN/ESN of all vehicles that are to be monitored, the timeframes during which the vehicles are to be monitored and the specific zones or boundaries with respect to which vehicle movement is to be monitored. Similar types of information may be entered by parents or government officials wishing to monitor movements of individuals or by wireless carries or network subscribers relating to bill zones. The boundary crossings application can then monitor movements of the mobile unit or units of interest by receiving and storing (406) current location information, retrieving (408) prior location information for the mobile unit or units, and using (410) the current and prior location information to determine whether a service zone boundary has been crossed during the intervening time interval. This monitoring can continue throughout a time period as specified by a network user. With regard to the process for monitoring location, the system user may specify a frequency for monitoring if desired. Thus, for example, a rental car company may request position updates every ten minutes or at some other interval. At each such interval, the boundary crossings application may access the most recent information available in the location cache or may invoke the location finding equipment to obtain current information. It will be appreciated that different frequencies may be useful for different applications. Alternatively, the boundary crossings application can be programmed to make a boundary crossing determination each time new location information is received for a mobile unit of interest. In this regard, it will be appreciated that such location information may be obtained as a result of a periodic polling process in connection with normal network administration.

The process of using the current and prior location information to identify boundary crossings may utilize the two most recent instances of location information for a particular mobile unit, or may utilize location information for other times. Moreover, in certain cases, such as in the case of GPS information, location information for a particular time may be coupled with travel direction and speed information. Such travel direction and speed information may also be obtained by processing location information for a particular mobile unit at two or more times. In such cases, tracking information may be used to identify or predict a boundary crossing without relying on a change of status as between first and second location information and first and second times relative to a zone boundary. Once a determination is made (412) as to whether a boundary crossing has occurred, the boundary crossing application may continue monitoring mobile unit location/movement and/or may generate (414) service information according to application parameters. In the latter regard, the boundary crossings application may be programmed to output a billing parameter, retrieve and transmit prerecorded service information, or otherwise output service information depending on the specifics of the program. The service information is then transmitted (416) according to application parameters. Such application parameters may specify the recipient, content and format of the service information as discussed above.

While various embodiments of the present invention have been described in detail, it is apparent that further modifications and adaptations of the invention will occur to those skilled in the art. However, it is to be expressly understood that such modifications and adaptations are within the spirit and scope of the present invention.

What is claimed is:

1. A method of providing location-based services for a mobile unit operating in a wireless network including a processing platform, data storage associated with the processing platform, and a plurality of cell sites; the method comprising:

receiving an identifier associated with the mobile unit;
receiving geographic zone boundary information;
storing the geographic zone boundary information in the data storage associated with the processing platform;
identifying a number of cell sites characterized by a cell site coverage area intersected by the geographic zone boundary, wherein each of the identified number of cell sites comprise a plurality of cell sectors having a cell sector coverage area and having a cell sector boundary;
identifying a subset of cell sectors characterized by a cell sector coverage area intersected by the geographic zone boundary;
defining a service zone region formed by the union of the subset of cell sectors;

defining a service zone boundary formed by portions of the boundaries of the identified subset of cell sectors;

monitoring a location of the mobile unit using the identifier and a network-assisted location finding system to identify a crossing of the service zone boundary by the mobile unit; and transmitting service information to a system user in response to the crossing of the service zone boundary.

2. The method of claim 1 wherein the service zone boundary approximates the geographic zone boundary.

3. The method of claim 1 wherein the service zone boundary is referenced to known locations of a plurality of the network structures.

4. The method of claim 3 wherein the known locations of the plurality of the network structures are a plurality of cell sectors intersecting the geographic zone boundary.

5. The method of claim 1 wherein the system user is a network user separate from a user of the mobile unit.

6. The method of claim 5 wherein the network user is a person of authority monitoring the movements of a person or a vehicle associated with the mobile unit.

7. The method of claim 1 wherein monitoring a location of the mobile unit comprises:

obtaining first location information regarding a first location of the mobile unit at a first time;

obtaining second location information regarding a second location of the mobile unit at a second time; and comparing the first location information to the second location information to identify the crossing of the service zone boundary by the mobile unit.

8. The method of claim 1 wherein the network-assisted location finding system comprises network-assisted GPS.

9. The method of claim 1 wherein transmitting service information comprises sending at least one of a voice, text, or graphical message.

10. A method of identifying service zone boundary crossings by a mobile unit operating in a wireless network including a plurality of cell sites, each of the plurality of cell sites comprising a plurality of cell sectors, the wireless network comprising a network-based location finding system, the method comprising:

defining a geographic zone boundary;

identifying a number of the plurality of cell sites characterized by a cell site coverage area intersected by the geographic zone boundary;

identifying a number of the plurality of cell sectors characterized by a cell sector coverage area intersected by the geographic zone boundary;

defining a service zone region formed by the union of the identified number of the plurality of cell sectors;

receiving an identifier associated with the mobile unit;

receiving a location of the mobile unit from the network-based location finding system;

monitoring the location of the mobile unit to identify an entry and/or an exit of the mobile unit into the service zone region; and transmitting service information to a system user in response to the entry and/or exit of the mobile unit into the service zone region.

11. The method of claim 10 wherein the identified number of the plurality of cell sectors intersecting the geographic zone boundary define a service zone boundary.

12. The method of claim 11 wherein the service zone boundary approximates the geographic zone boundary.

13. The method of claim 10 wherein the network-based location finding system comprises network-assisted GPS.

14. The method of claim 10 wherein the system user is a network user separate from a user of the mobile unit.

15. A method for providing services based on a location of a mobile unit in a wireless communications network, the wireless communications network including a network-assisted location-based services application; the method comprising:

receiving a geographic zone boundary referenced to a geographic topology;

converting the geographic zone boundary to a service zone boundary referenced to a wireless communications network topology, wherein converting the geographic zone boundary to a service zone boundary comprises:

identifying cell sites having a coverage area intersecting the geographic zone boundary;

identifying cell sectors from the identified cell sites, wherein the identified cell sectors have a coverage area intersecting the geographic zone boundary;

forming a union of the identified cell sectors; and defining the service zone boundary formed by portions of boundaries of the union of the identified cell sectors;

receiving a mobile unit identifier;

monitoring the location of the mobile unit, using the network-assisted location-based services application and the mobile unit identifier, to identify a crossing of the service zone boundary by the mobile unit; and transmitting service information regarding the mobile unit in response to the crossing of the service zone boundary by the mobile unit.

16. The method of claim 15 wherein the geographic topology comprises street boundaries.

17. The method of claim 15 wherein the wireless communications network topology comprises cell sector identifiers.

18. The method of claim 15 wherein transmitting service information comprises sending a message to a system user other than a user of the mobile unit.

19. The method of claim 18 wherein transmitting service information comprises notifying the system user of the crossing of the service zone boundary by the mobile unit.

20. The method of claim 18 wherein the message is an aural, textual, and/or graphical message.

* * * * *